United States Patent [19]

Durif

[11] Patent Number: 5,125,446

[45] Date of Patent: Jun. 30, 1992

[54] REVERSE TIRE BEAD

[75] Inventor: Pierre Durif, Volvic, France

[73] Assignee: Compagnie Generale des Establissements Michelin-Michelin & CIE, Clermont-Ferrand, France

[21] Appl. No.: 657,939

[22] Filed: Feb. 21, 1991

Related U.S. Application Data

[63] Continuation of Ser. No. 414,324, Sep. 29, 1989, abandoned.

[30] Foreign Application Priority Data

Oct. 5, 1988 [FR] France .............................. 88 13148

[51] Int. Cl.⁵ .......................................... B60C 15/024
[52] U.S. Cl. ................................. 152/544; 152/379.5
[58] Field of Search .................. 152/539, 544, 39.3, 152/379.5, 380

[56] References Cited

U.S. PATENT DOCUMENTS

| | | | |
|---|---|---|---|
| 1,915,963 | 6/1933 | Wait | 152/544 |
| 4,732,198 | 3/1988 | Frerichs et al. | 152/544 |
| 4,961,453 | 10/1990 | Durif | 152/379.3 |

FOREIGN PATENT DOCUMENTS

| | | | |
|---|---|---|---|
| 0122731 | 7/1944 | Australia | 152/544 |
| 0202333 | 6/1956 | Australia | 152/544 |
| 0152567 | 12/1984 | European Pat. Off. | |
| 0153295 | 1/1985 | European Pat. Off. | |
| 0212333 | 7/1986 | European Pat. Off. | |
| 0328873 | 1/1989 | European Pat. Off. | 152/379.3 |
| 0893164 | 10/1953 | Fed. Rep. of Germany | 152/544 |
| 3605803 | 1/1987 | Fed. Rep. of Germany | |

OTHER PUBLICATIONS

Patent Abstracts of Japan, vol. 8, No. 280 (M-347) [1717], 21 Dec. 1984; & JP-A-59 149 802 (Sumitomo Gomu Kogyo K.K.) Aug. 27, 1984.

*Primary Examiner*—Michael W. Ball
*Assistant Examiner*—Nancy T. Krawczyk
*Attorney, Agent, or Firm*—Oblon, Spivak, McClelland, Maier & Neustadt

[57] ABSTRACT

A reverse bead type tire includes a tread, two sidewalls extending from the tread and a bead formed on an adge of each of the sidewalls. Each bead has a bead wire embedded therein and has a contact face which seats on a substantially axially extending seat of a wheel rim. The bead further has a bearing surface seated on a substantially radially inwardly projecting flange which forms an extension of the seat. The bead is configured with surface discontinuities such that a surface area of actual contact of the bead on the seat is less than a surface area of the seat between the flange and a plane P perpendicular to the rotational axis of the wheel and tangent to an axially inside point of the bead wire. As a result, localized pressures at the area of actual contact are high so that tightness of the tire on the wheel is assured. On the other hand, such tightness produced by localized high pressures does not increase mounting difficulty of the tire on the wheel rim.

3 Claims, 2 Drawing Sheets

REVERSE TIRE BEAD

This application is a continuation of application Ser. No. 07/414,324 filed on Sep. 29, 1989, now abandoned.

BACKGROUND OF THE INVENTION

1. Field of the Invention

This invention relates to the beads of those tires which rest radially of the inside of the wheel rim, called hooked tires.

2. Related Art

Wheel rims designed to receive such tires comprise on each side a seat, usually inclined slightly relative to the axis of the wheel rim. The seat is extended axially outward by a flange which projects approximately perpendicular to the axis and extends radially inside the wheel rim. To assure a correct positioning of the tire on the wheel rim, guaranteeing good static and dynamic balancing, the tire should rest uniformly on the seat as well as against the flange. In other words, the pressure of wheel rim-tire contact should be circumferentially constant.

The bead of tires with reverse beads generally comprises a large volume of rubber, which results in a great variation in the positioning of the bead wire. If the effect of the variations caused by the manufacturing tolerances of the wheel rims and bead wires, as well as the molding tolerances of the bead, are added to this, the result is that in mounting position the ratio of the thickness of rubber between the bead wire and the face of the bead that is intended to rest on the wheel rim divided by the ideal spacing between the bead wire and the surface of the wheel rim varies significantly. Since this ratio determines the tightness of the bead on the wheel rim, such variations of this ratio very often cause the tightness variations to exceed acceptable tolerances.

Therefore, it cannot be guaranteed that the tightness will be adequate. Consequently, the bead wire is positioned off center relative to the wheel rim and/or is not placed in a plane manner, and/or is placed in a way not parallel to the flange.

If an adjustment of the bead wire which guarantees the existence of an adequate tightness is chosen, then considering the large variations of this tightness, the adjustment will be such that tightness is in some cases so great that it will not be possible to mount certain tires.

SUMMARY OF THE INVENTION

An object of the present invention is to position the bead on the wheel rim as precisely as possible.

A further object of this invention is to permit increased tightness of the bead on the wheel rim while at the same time avoiding excessive tightness which can prevent improper mounting.

It is yet a further object of the present invention to position the bead wire in the bead as precisely as possible.

The above, and other, objects are achieved according to the present invention by a reverse bead type tire comprising a tread, two sidewalls extending from the tread and a bead formed on an edge of each of the sidewalls, each bead having a bead wire embedded therein and having a contact face which seats on a substantially axially extending seat of a wheel rim when the tire is mounted on a wheel. The bead further has a bearing surface seated, when the tire is mounted on a wheel, on a substantially radially inwardly projecting flange which forms an extension of the seat. The bead is configured with at least one surface discontinuity such that a surface area of actual contact of the bead on the seat is less than a surface area of the seat between and including the flange and a plane P perpendicular to the rotational axis of the wheel and tangent to an axially inside point of the bead wire. As a result, localized pressures at the area of actual contact are high so that tightness of the tire on the wheel is assured. On the other hand, such tightness produced by localized high pressures does not increase mounting difficulty of the tire on a wheel rim.

According to an embodiment, the configuration of the bead which produces such localized high pressures comprises multiple circumferentially spaced recesses in a portion of the bead corresponding to an intersection of the contact face with the bearing surface, so that the bead does not contact the seat at the recesses. Preferably, the recesses extend to the casing of the bead wire, and so permit the bead wire to be positively held during molding. This permits more accurate positioning of the bead wire.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
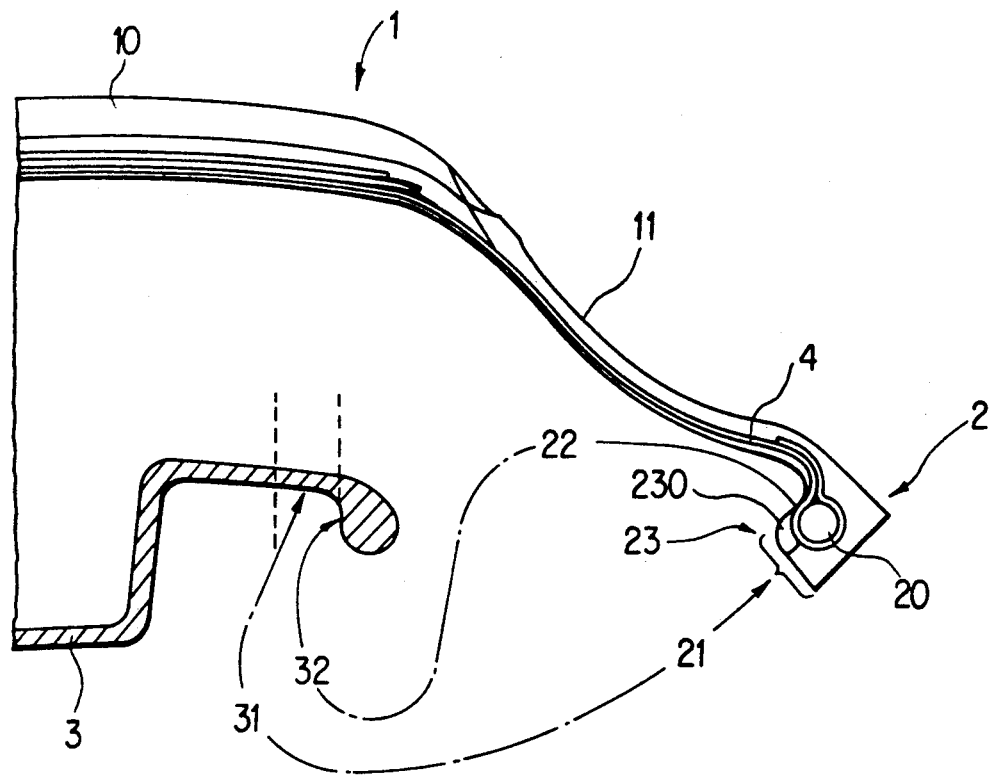
FIG. 1 shows a tire in molding position, as well as the wheel rim on which it is to be mounted.
Figure 2:
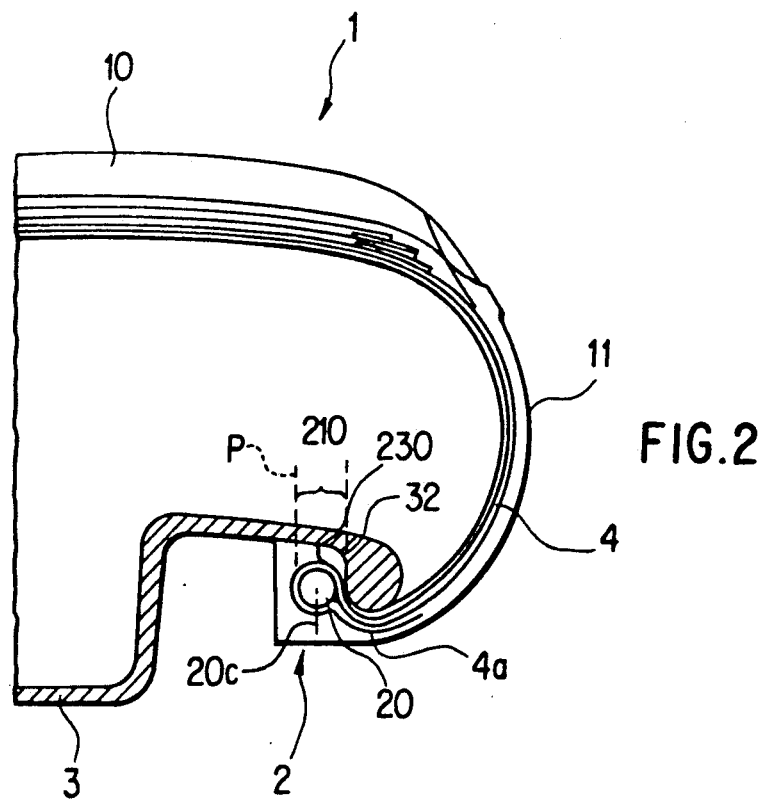
FIG. 2 shows the same tire in mounting position on a wheel rim.

Tire 1 with reverse bead, of which an axial half is seen in FIGS. 1 and 2, has a tread 10, two sidewalls 11 and two beads 2. Bead 2 of this type of tire 1 rests on substantially axially extending seat portion 31 of the seat of the wheel rim 3 by a seating face 21 which is, in mounting position, placed radially outside bead wire 20. The bead also rests on that part of the bead at the substantially radially extending flange 32 of the wheel rim, located axially on the outer side of bead wire 20.

The position in which the vulcanization is performed is usually that seen in FIG. 1, where it is seen that bead 2 is displaced by a significant angle (approximately 130°) relative to the mounting position seen in FIG. 2. This orientation heightens the effect of the manufacturing tolerances of bead wire 20 and wheel rim 3, and the positioning error of bead wire 20 inside bead 2, on the tightness of bead 2 on wheel rim 3. Moreover, in this type of tire 1, bead wire 20 is stressed by compression, while in the tires with the bead on the outside of the wheel rim, the bead wire is stressed by traction. All this makes this tire 1 more sensitive to the positioning inaccuracies of bead wire 20.

Each bead 2 rests on wheel rim 3 by the contact or seating face 21, having a radial projection (tire considered in mounting position) on wheel rim 3 defines seat portion 31. It also rests on flange 32 of wheel rim 3 by a bearing surface 22 approximately of the seat which is perpendicular to contact face 21.

The contact pressure of bead 2 on seat portion 31 is a significant parameter for the good holding of tire 1. It should be sufficient to assure a correct centering of tire 1 relative to wheel rim 3, and not excessive to permit easy mounting. Bead wire 20 should extend quite parallel to flange 32 acting as a mechanical stop. For this purpose the bead is constructed with at least one surface discontinuity such that, on the side thereof axially outside a plane P perpendicular to the rotation axis and tangent to the axially inside point of the bead wire 20, the area of surface 210 thereof corresponding to an actual contact of bead 2 on the seat is less than that of the entire surface 310 of said seat between and including said tangent plane P and said flange 32.

This modification decisively affects the tightness of bead 2 on wheel rim 3 since it creates localized zones of high pressure. The reduction of area of actual contact may be obtained by forming the surface discontinuity as, for example at least one continuous peripheral groove on contact face 21. A notching rate based on concepts comparable to those used for the tread patterns thus can be defined. In this way, adequate contact pressures can be obtained on a small surface during mounting, which is not detrimental to the ease of mounting, in contrast to an equivalent pressure, or even slightly less pressure, distributed over the entire surface of seat portion 31.

Preferably, the groove or notching is limited to a portion of the bead between the junction 4a of the bead with the sidewall 4 and the plane 20c perpendicular to the rotational axis of the wheel axis of the wheel and passing through the center of the bead wire 20.

Also, for better control of the contact pressure, both notching and a more exacting positioning of bead wire 20 are assured by providing, on the surface of the means used for the molding of face 21 of bead 2, multiple lugs projecting inside the bead. Such lugs of the mold extend so as to contact or almost contact, casing layer 4 surrounding bead wire 20. The lugs both form recesses 230 and hold the wire during molding. In this way, the rubber which during vulcanization goes through a viscous stage before solidification, has less effect on the positioning of bead wire 20 since the latter is maintained by elements slightly or not at all deformable: the said lugs and the casing layer 4, which can be considered as nondeformable, if stressed by pinching or by traction in the direction of the core of the wires. The lugs thus act on bead wire 20 via casing layer 4.

Figure 3:
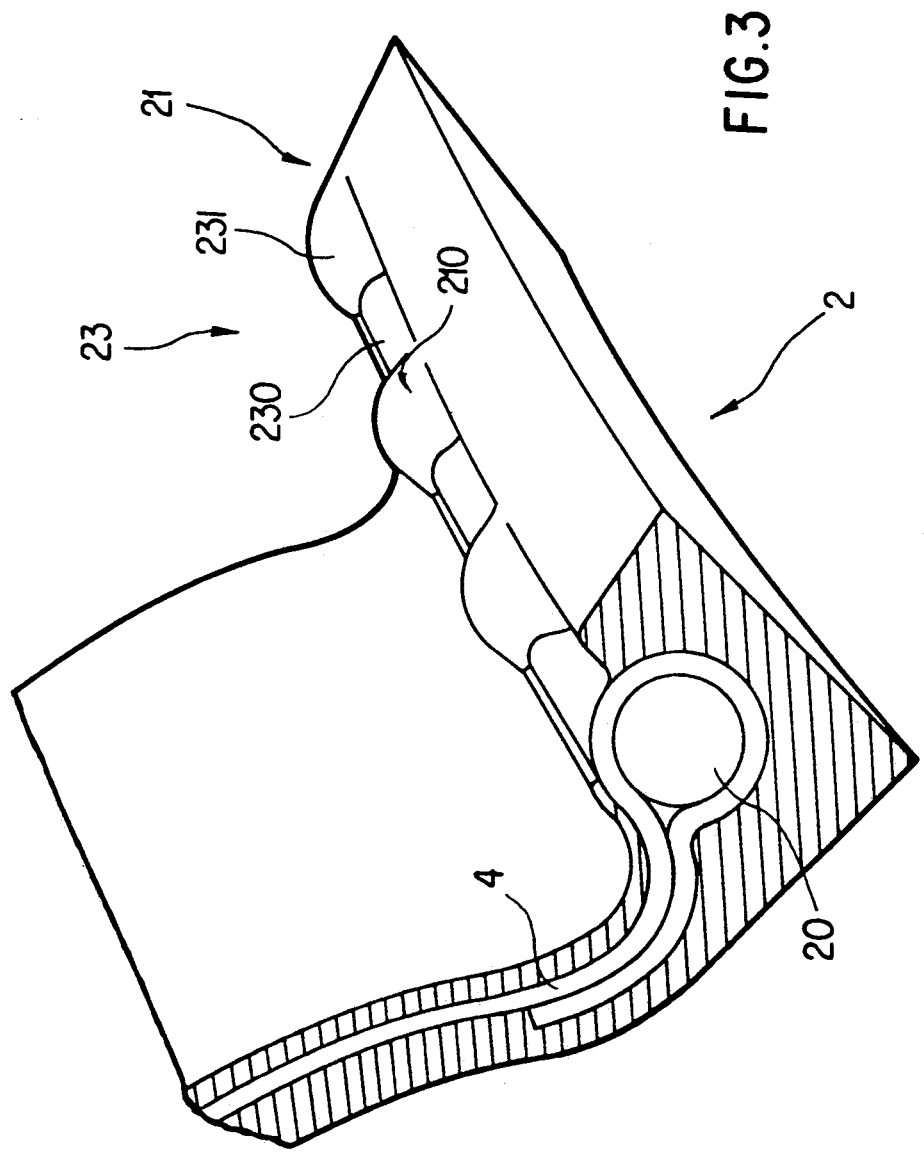
FIG. 3 shows a partial view of the bead profile.

Zone 23 of bead 2, corresponding to the intersection of seating face 21 and bearing surface 22 exhibits, as the surface discontinuities, multiple recesses 230 formed by the mold lugs. The recesses are distributed over the circumference of the tire and are separated by bosses 231, said recesses 230 extending to casing 4 at a portion of the casing where it surrounds bead wire 20. The sectional area of the bead therefore is not identical on the entire circumference. This is best seen in FIG. 3. There is thus a sequence of sections exhibiting successive recesses 230 and solid sections. In this way, a very precise positioning of the bead wire is attained without reducing too significantly the area of seating face 21 on seat portion 31. Thus, the requirements of volume of bead 2, broad tightness tolerances and precise positioning of bead on its seat, are reconciled.

As best seen in FIG. 3, the surface corresponding to an actual contact of bead 2 on seat portion 31 consists of a continuous bearing surface 21a of circumferentially constant width, as well as a series of bearing surfaces composed of bosses 231. The desirable notching rate (by analogy with the tread patterns) is between 30% and 70%, considering the part of face 21 axially outside the plane P. That is, the recesses 230 are sized such that between 30% and 70% of that portion of the contact face which is axially outside of the plane P does not contact the seat.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A reverse-bead type tire for mounting to a wheel having a rim defining a seat, said seat including a substantially axially extending seat portion and a substantially radially inwardly projecting flange axially outside of the seat portion, said tire comprising:
   a tread;
   two sidewalls extending from said tread; and
   a bead formed at an edge of each of said sidewalls, each said bead having a bead wire embedded therein and having a seating face which seats on the seat portion of the seat of a wheel rim when said tire is mounted on a wheel,
   wherein said bead includes at least one surface discontinuity at said seating face, said at least one surface discontinuity comprising multiple circumferentially spaced recesses in a portion of said bead corresponding to a region of the intersection of said seat portion and said flange, such that axially outward of a plane perpendicular to the rotational axis of the wheel and tangent to an axially inside point of said bead wire a surface area of actual contact of said bead on the seat, when said tire is mounted on a wheel, is less than a surface area of the seat,
   a casing layer covering said bead wire, said recesses extending substantially to said casing;
   whereby said bead does not contact the seat at said recesses and localized pressures at said area of actual contact are high so that both tightness of said tire on the wheel and ease of mounting are assured.

2. The tire of claim 1 wherein the configuration of said bead is such that between 30% and 70% of a portion of said seating face which is axially outside of said plane does not contact the seat when said tire is mounted on the wheel.

3. The tire of claim 1 wherein the configuration of said bead comprises at least one recess positioned only in a portion of said bead which is between a junction of said bead with a respective one of said sidewalls and a plane perpendicular to the rotational axis of the wheel and passing through the center of the bead wire.

* * * * *